United States Patent
Lemmer et al.

(10) Patent No.: US 8,187,713 B2
(45) Date of Patent: *May 29, 2012

(54) COATED ARTICLE WITH LOW-E COATING INCLUDING TIN OXIDE INTERLAYER

(75) Inventors: Jean-Marc Lemmer, Lorentzweiler (LU); Jens-Peter Muller, Differdange (LU); Jose Ferreira, Luxembourg (LU); Pierre Pallotta, Villerupt (FR)

(73) Assignee: Centre Luxembourgeois de Recherches pour le Verre et la Ceramique S.A. (C.R.V.C), Grand Duche de Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,656

(22) Filed: Dec. 2, 2010

(65) Prior Publication Data

US 2011/0097590 A1   Apr. 28, 2011

Related U.S. Application Data

(63) Continuation of application No. 12/385,234, filed on Apr. 2, 2009, now Pat. No. 7,858,191, which is a continuation of application No. 11/393,732, filed on Mar. 31, 2006, now Pat. No. 7,534,496, which is a continuation of application No. 10/914,636, filed on Aug. 10, 2004, now Pat. No. 7,081,302, which is a continuation-in-part of application No. 10/797,561, filed on Mar. 11, 2004, now Pat. No. 7,217,460, and a continuation-in-part of application No. 10/787,823, filed on Feb. 27, 2004, now Pat. No. 7,462,398.

(51) Int. Cl.
*B32B 17/06* (2006.01)

(52) U.S. Cl. ........ 428/428; 428/446; 428/697; 428/698; 428/701; 428/702; 428/704

(58) Field of Classification Search ............ 204/192.11; 428/426, 428, 432, 446, 697, 698, 701, 702, 428/704

See application file for complete search history.

(56) References Cited

U.S. PATENT DOCUMENTS 4,806,220 A    2/1989   Finley
(Continued)

FOREIGN PATENT DOCUMENTS

DE    42 11 363    10/1993
(Continued)

OTHER PUBLICATIONS

U.S. Appl. No. 12/385,234, filed Apr. 2, 2009; Lemmer et al.
(Continued)

*Primary Examiner* — Jennifer McNeil
*Assistant Examiner* — Lauren Robinson
(74) *Attorney, Agent, or Firm* — Nixon & Vanderhye P.C.

(57) ABSTRACT

A coated article is provided which may be heat treated (e.g., thermally tempered) in certain instances. In certain example embodiments, an interlayer of or including a metal oxide such as tin oxide is provided under an infrared (IR) reflecting layer so as to be located between respective layers comprising silicon nitride and zinc oxide. It has been found that the use of such a tin oxide inclusive interlayer results in significantly improved mechanical durability, thermal stability and/or haze characteristics. In certain example embodiments, a zinc oxide inclusive layer is provide over an IR reflecting layer in order to improve thermal stability. A zirconium oxide overcoat may also be provided in certain example instances.

16 Claims, 5 Drawing Sheets

U.S. PATENT DOCUMENTS

| | | |
|---|---|---|
| 4,898,789 A | 2/1990 | Finley |
| 5,110,662 A | 5/1992 | Depauw et al. |
| 5,153,054 A | 10/1992 | Depauw et al. |
| 5,270,517 A | 12/1993 | Finley |
| 5,344,718 A | 9/1994 | Hartig et al. |
| 5,552,180 A | 9/1996 | Finley et al. |
| 5,557,462 A | 9/1996 | Hartig et al. |
| 5,584,902 A | 12/1996 | Hartig et al. |
| 5,688,585 A | 11/1997 | Lingle et al. |
| 5,770,321 A | 6/1998 | Hartig et al. |
| 5,800,933 A | 9/1998 | Hartig et al. |
| 5,821,001 A | 10/1998 | Arbab et al. |
| 5,837,361 A | 11/1998 | Glaser et al. |
| 5,935,702 A | 8/1999 | Macquart et al. |
| 5,942,338 A | 8/1999 | Arbab et al. |
| 5,948,538 A | 9/1999 | Brochot et al. |
| 6,042,934 A | 3/2000 | Guiselin et al. |
| 6,045,896 A | 4/2000 | Boire et al. |
| 6,090,481 A | 7/2000 | Depauw et al. |
| 6,287,675 B1 | 9/2001 | Guiselin et al. |
| 6,322,881 B1 | 11/2001 | Boire et al. |
| 6,336,999 B1 | 1/2002 | Lemmer et al. |
| 6,340,529 B1 | 1/2002 | Ebisawa et al. |
| 6,445,503 B1 | 9/2002 | Lingle |
| 6,514,620 B1 | 2/2003 | Lingle et al. |
| 6,524,688 B1 | 2/2003 | Eby et al. |
| 6,524,714 B1 | 2/2003 | Neuman et al. |
| 6,541,084 B2 | 4/2003 | Wang |
| 6,572,940 B1 | 6/2003 | Noethe et al. |
| 6,576,349 B2 | 6/2003 | Lingle et al. |
| 6,582,809 B2 | 6/2003 | Boire et al. |
| 6,589,658 B1 | 7/2003 | Stachowiak |
| 6,602,608 B2 | 8/2003 | Stachowiak |
| 6,605,358 B1 | 8/2003 | Stachowiak |
| 6,625,875 B2 | 9/2003 | Sol |
| 6,632,491 B1 | 10/2003 | Thomsen et al. |
| 6,686,050 B2 | 2/2004 | Lingle et al. |
| 7,081,302 B2 * | 7/2006 | Lemmer et al. ............... 428/428 |
| 7,150,916 B2 | 12/2006 | Lemmer et al. |
| 7,217,460 B2 | 5/2007 | Nunez-Regueiro et al. |
| 7,462,398 B2 | 12/2008 | Lemmer et al. |
| 7,534,496 B2 * | 5/2009 | Lemmer et al. ............... 428/428 |
| 7,858,191 B2 * | 12/2010 | Lemmer et al. ............... 428/428 |
| 2002/0064662 A1 | 5/2002 | Lingle et al. |
| 2003/0150711 A1 * | 8/2003 | Laird ....................... 204/192.11 |
| 2004/0005467 A1 | 1/2004 | Neuman et al. |
| 2004/0009356 A1 | 1/2004 | Medwick et al. |
| 2004/0043226 A1 | 3/2004 | Laird et al. |
| 2005/0042459 A1 | 2/2005 | Kriltz et al. |
| 2005/0191501 A1 | 9/2005 | Lemmer et al. |
| 2005/0202254 A1 | 9/2005 | Nunez-Regueiro et al. |

FOREIGN PATENT DOCUMENTS

| | | |
|---|---|---|
| EP | 1 174 397 | 1/2002 |

OTHER PUBLICATIONS

U.S. Appl. No. 11/641,827, filed Dec. 20, 2006, Nunez-Regueiro et al.

* cited by examiner

COATED ARTICLE WITH LOW-E COATING INCLUDING TIN OXIDE INTERLAYER

This application is a continuation of 12/385,234, filed Apr. 2, 2009 (now U.S. Pat. No. 7,858,191), which is a continuation of 11/393,732, filed Mar. 31, 2006, (now U.S. Pat. No. 7,534,496) which is a continuation of 10/914,636, filed Aug. 10, 2004, (now U.S. Pat. No. 7,081,302), which is a continuation-in-part (CIP) of U.S. patent application Ser. No. 10/797,561, filed Mar. 11, 2004, (now U.S. Pat. No. 7,217,460), and a CIP of 10/787,823, filed Feb. 27, 2004, (now U.S. Pat. 7,462,398) the disclosures of which are all hereby incorporated herein by reference.

This invention relates to a coated article including a low-E coating. In certain example embodiments, an interlayer comprising tin oxide or the like may be provided under an infrared (IR) reflecting layer and in particular between respective layers comprising silicon nitride and zinc oxide. In certain embodiments, a zinc oxide layer may be provided over an IR reflecting layer to improve thermal stability. In certain example embodiments, the coated article may be heat treated (e.g., thermally tempered, heat bent and/or heat strengthened). Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat thermally temper, heat bend and/or heat strengthen) such coated articles for purposes of tempering, bending, or the like in certain example instances.

In certain situations, designers of coated articles often strive for a combination of high visible transmission, substantially neutral color, low emissivity (or emittance), and low sheet resistance ($R_s$). High visible transmission for example may permit coated articles to be more desirable in certain window applications, whereas low-emissivity (low-E) and low sheet resistance characteristics permit such coated articles to block significant amounts of IR radiation so as to reduce for example undesirable heating of vehicle or building interiors.

However, heat treatment of coated articles typically requires use of temperature(s) of at least 580 degrees C., more preferably of at least about 600 degrees C. and still more preferably of at least 620 degrees C. The use of such high temperatures (e.g., for 5-10 minutes or more) often causes coatings to break down and/or causes one or more of the aforesaid desirable characteristics to significantly deteriorate in an undesirable manner. Those in the art strive for heat treatability in certain applications, coupled with acceptable optical and solar characteristics.

Consider the following heat treatable coated article with the below-listed layer stack, where the layers are listed in order from the 6 mm thick clear glass substrate outwardly.

| Layer Glass Substrate | Thickness (Å) |
|---|---|
| $TiO_2$ | 33.1 |
| $Si_3N_4$ | 110 |
| ZnO | 100 |
| Ag | 107 |
| $NiCrO_x$ | 36.5 |
| $SnO_2$ | 482.7 |
| $Si_3N_4$ | 110 |
| ZnO | 100 |
| Ag | 159.5 |
| $NiCrO_x$ | 36.5 |
| $SnO_2$ | 100 |
| $Si_3N_4$ | 193.4 |

While the aforesaid coated article is heat treatable, there is room for improvement with regard to thermal stability. For example, as shown in FIGS. 2-5, lengthy heat treatments at high temperatures tend to cause this coated article to suffer significant drops in visible transmission, significant changes in certain color value(s), and significant increases in sheet resistance ($R_s$). There is room for improvement in one or more of these respects.

Additionally, the aforesaid coated article is susceptible to scratching in certain instances, and is also sometimes characterized by high haze values following heat treatment.

In view of the above, it will be apparent to those skilled in the art that there exists a need for coated articles which are capable of realizing (a) improved thermal stability with regard to visible transmission, color, emissivity (or emittance), and/or sheet resistance ($R_s$); (b) improved mechanical durability such as scratch resistance; and/or (c) improved haze characteristics. In certain example embodiments, it may be desired that one or all of these characteristics can be achieved.

BRIEF SUMMARY OF EXAMPLE EMBODIMENTS OF THE INVENTION

In certain example embodiments of this invention, an interlayer comprising tin oxide is provided under an infrared (IR) reflecting layer so as to be located between respective layers comprising silicon nitride and zinc oxide.

In certain example embodiments of this invention, a layer comprising zinc oxide is provided over a contact layer that is in contact with an IR reflecting layer of a material such as silver. Surprisingly, it has been found that the use of such a zinc oxide inclusive layer results in improved thermal stability upon heat treatment, more neutral and/or desirable coloration, lower sheet resistance ($R_s$), and/or lower emissivity.

In certain example embodiments, the aforesaid zinc oxide inclusive layer and the aforesaid tin oxide inclusive interlayer may be used in combination in the same coated article.

Unexpectedly, it has been found that the use of such a tin oxide inclusive interlayer (or adhesion layer) results in significantly improved thermal stability, mechanical durability (e.g., scratch resistance), and haze characteristics; and the use of such a zinc oxide inclusive layer results in improved thermal stability upon heat treatment, more neutral and/or desirable coloration, lower sheet resistance ($R_s$), and/or lower emissivity.

For example, with regard to thermal stability, it has been found that the use of such a tin oxide inclusive interlayer and/or such a zinc oxide inclusive layer over an upper contact layer results in a coated article which is capable of realizing one or more of: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, and/or (g) improved haze characteristics following heat treatment. It has also been found that the provision of this tin oxide inclusive interlayer is also capable of significantly improving mechanical durability and haze characteristics of the coated article, compared to if the layer were not present.

These surprisingly results in tin oxide inclusive interlayer embodiments, which in certain example instances are associated with the use of the combination layer stack portion of glass . . . $Si_xN_y/SnO_2/ZnO/Ag$ . . . , are highly advantageous, since mechanical durability, higher visible transmission, lower emissivity, lower sheet resistance, reduced haze, and/or improved thermal stability are typically desired features in coated articles.

Surprisingly, it has been found that the provision of the zinc oxide inclusive layer directly over and contacting the nickel chrome oxide inclusive layer above the IR reflecting layer provides for unexpected results. In particular, by using zinc oxide in this layer (as opposed to solely tin oxide for example as in the aforesaid art example), the resulting coated article upon heat treatment (HT) unexpectedly has, for example, one or more of: improved thermal stability, more neutral or desirable coloration, lower sheet resistance ($R_s$), and lower emissivity (e.g., hemispherical emissivity). These surprisingly results associated with the use of the combination layer, stack portion of glass . . . $ZnO/Ag/NiCrO_x/ZnO$ . . . are highly advantageous, since lower emissivity, lower sheet resistance, desirable coloration and/or thermal stability are desired features in coated articles.

In certain example embodiments of this invention, there is provided a coated article comprising a coating supported by a glass substrate, the coating comprising: a first dielectric layer; a first infrared (IR) reflecting layer comprising silver located over at least the dielectric layer; a first layer comprising silicon nitride located over at least the first IR reflecting layer and the first dielectric layer; a first layer comprising tin oxide located over and contacting the first layer comprising silicon nitride: a first layer comprising zinc oxide located over and contacting the first layer comprising tin oxide, so that the first layer comprising tin oxide is located between and contacting the first layer comprising silicon nitride and the first layer comprising zinc oxide; a second IR reflecting layer comprising silver located over and contacting the first layer comprising zinc oxide; a contact layer located over and contacting the second IR reflecting layer; a second layer comprising zinc oxide located over and contacting the contact layer; and at least another dielectric layer located over at least the second layer comprising zinc oxide.

In other example embodiments of this invention, there is provided a coated article comprising a coating supported by a glass substrate, the coating comprising: a dielectric layer; a first layer comprising zinc oxide located over the dielectric layer; an infrared (IR) reflecting layer comprising silver located over and contacting the first layer comprising zinc oxide; a layer comprising an oxide of Ni and/or Cr located over and contacting the IR reflecting layer; a second layer comprising zinc oxide located over and contacting the layer comprising the oxide of Ni and/or Cr; and another dielectric layer comprising one or more of tin oxide, silicon nitride and/or zirconium oxide located over the second layer comprising zinc oxide.

DETAILED DESCRIPTION OF EXAMPLES OF THE INVENTION

Figure 1:
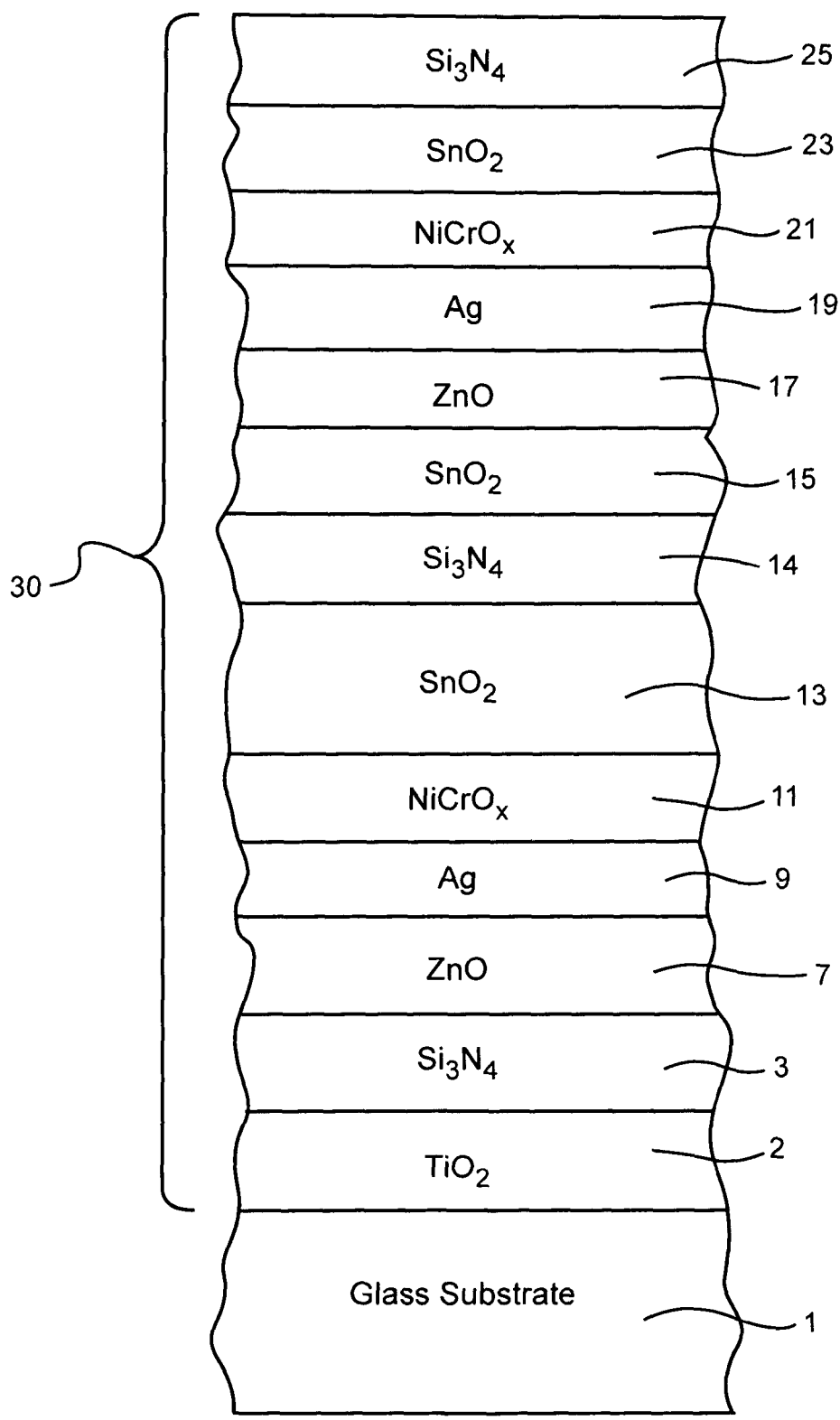
FIG. 1 is a cross sectional view of a coated article according to an example embodiment of this invention.

Coated articles herein may be used in applications such as IG window units, vehicle windows, monolithic architectural windows, residential windows, and/or any other suitable application that includes single or multiple glass substrates.

In certain example embodiments of this invention, an interlayer 15 comprising tin oxide or the like is provided under an infrared (IR) reflecting layer 19. In certain example embodiments, the interlayer comprising tin oxide 15 is located between respective layers comprising silicon nitride 14 and zinc oxide 17. Surprisingly, it has been found that the use of such a tin oxide inclusive interlayer 15 results in significantly improved thermal stability, improved mechanical durability (e.g., scratch resistance) and/or improved haze characteristics. In certain example embodiments of this invention, improved mechanical durability, thermal stability and/or corrosion resistance for heat-treatable low-E coated articles can be realized when thermodynamically stable silver based layers are deposited, and the use of the tin oxide is believed to aid in providing such silver based layers even though the tin oxide 15 is not in direct contact with the silver 19 in certain example embodiments of this invention. It is believed that the tin oxide 15 may reduce damage to the zinc oxide 17 which may otherwise be caused by silicon nitride 14 directly contacting the zinc 17 oxide in certain instances.

Figure 6A:
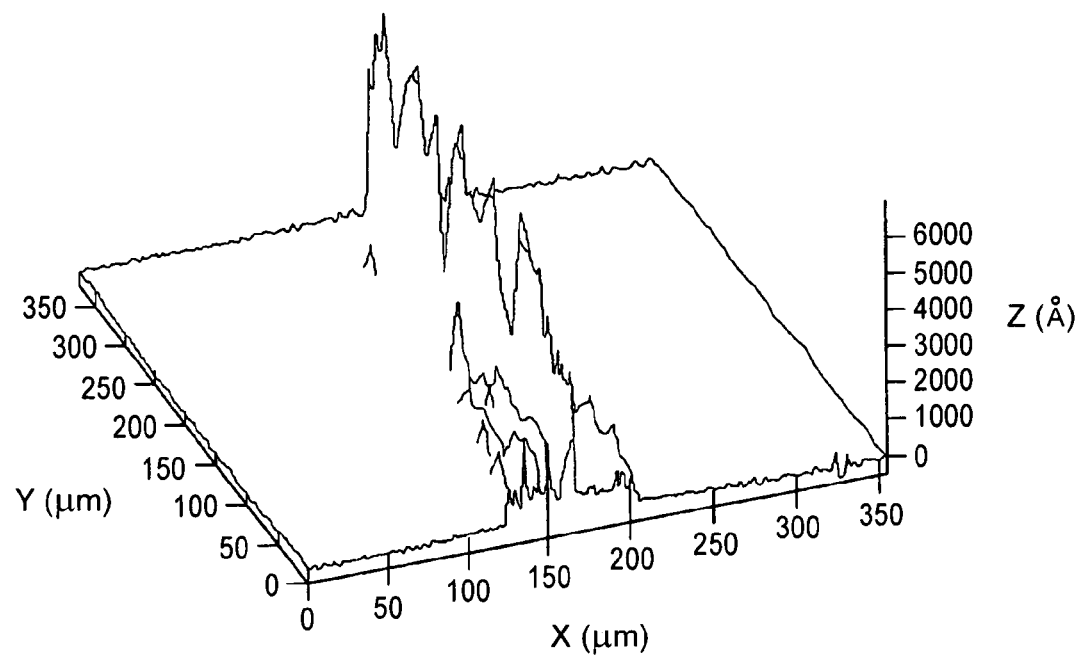
FIGS. 6(a) and 6(b) are surface morphology images illustrating improved scratch resistance of an Example of this invention compared to a Comparative Example (CE).
Figure 6B:
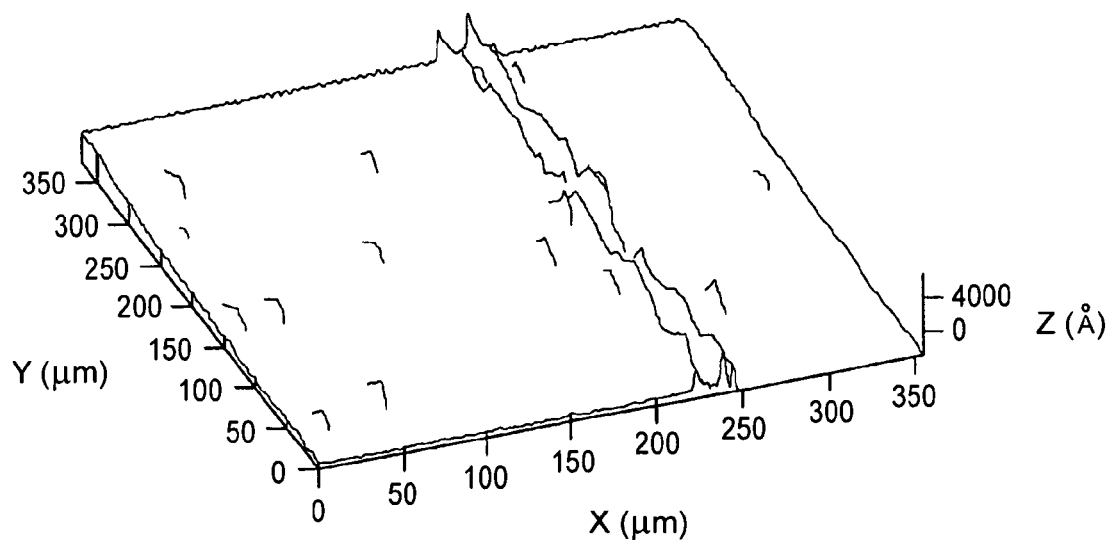

For example, with regard to thermal stability, it has unexpectedly been found that the use of such a tin oxide inclusive interlayer 15 results in a coated article which is capable of realizing one or more of: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, and/or (g) improved haze characteristics following heat treatment. Scratch resistance is also remarkably improved as shown in FIGS. 6(a)-(b).

These surprisingly results, which in certain example instances are associated with the use of the combination layer stack portion of $Si_xN_y/SnO_2/ZnO/Ag$, are highly advantageous since mechanical durability, higher visible transmission, lower emissivity, lower sheet resistance, reduced haze, and/or improved thermal stability are typically desired features in coated articles.

In certain example embodiments of this invention, the coating includes a double-silver stack, although this invention is not so limited in all instances.

For example, in certain example embodiments of this invention, heat treated coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). In certain example embodiments, following heat treatment and as measured in monolithic form, coated articles herein are capable of realizing a visible transmission (Ill. C, 2 degree) of at least 75%, more preferably of at least 77%, and most preferably of at least 78%. Moreover, in certain example embodiments, following heat treatment and coupling to another glass substrate to form an IG window unit, IG window unit coated articles according to certain example embodiments of this invention are capable of realizing a visible transmission of at least 60%, more preferably of at least 65%, even more preferably of at least 66%, and in certain embodiments of at least 67%.

Figure 7:
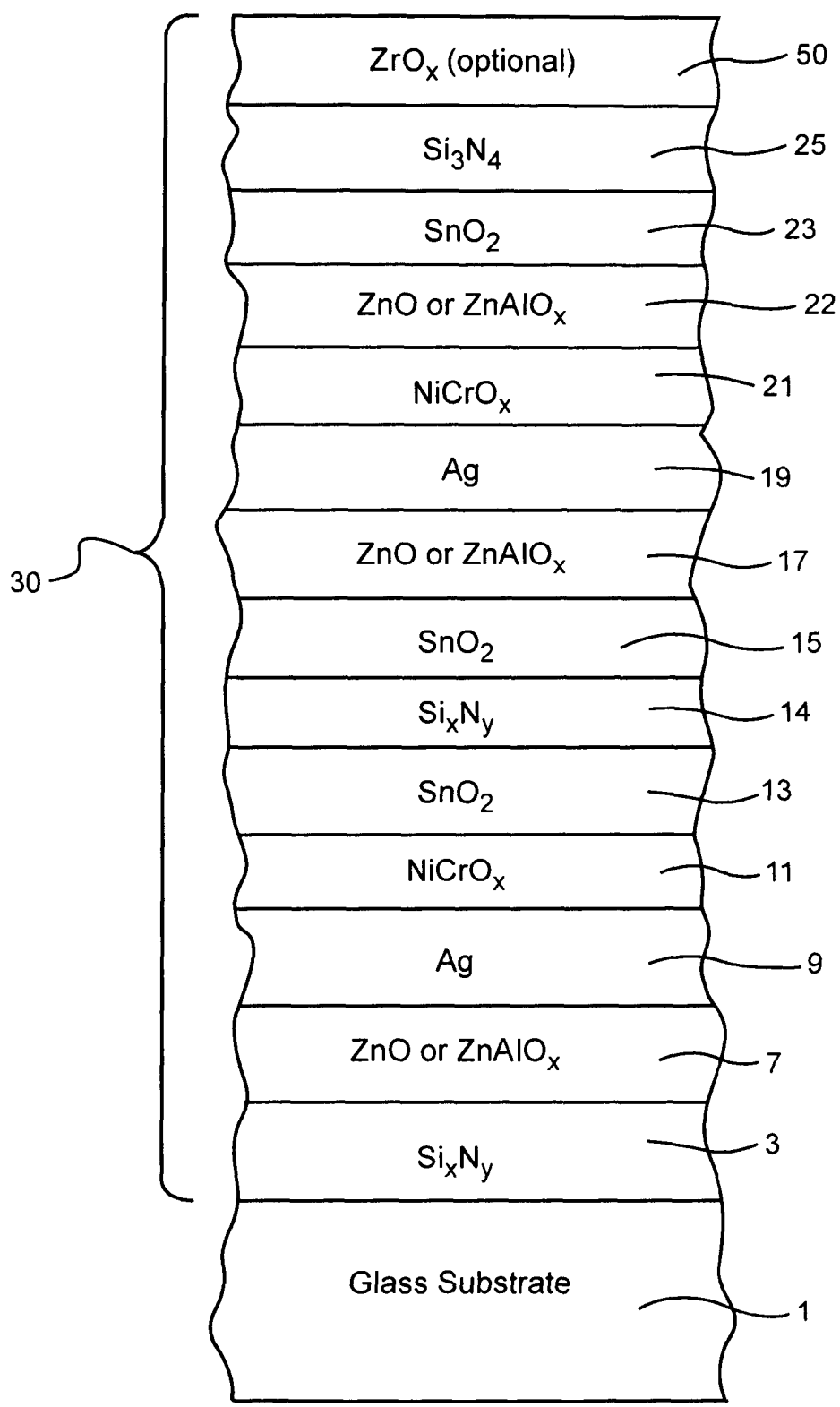
FIG. 7 is a cross sectional view of a coated article according to another example embodiment of this invention.

In other example embodiments of this invention (e.g., see FIG. 7), there is provided a zinc oxide inclusive layer 22 over the upper IR reflecting layer 19 with a contact layer 21 optionally therebetween. Unexpectedly and surprisingly, it has been found that the provision of the zinc oxide inclusive layer 22 directly over the nickel chrome oxide inclusive layer 21 above the silver inclusive infrared (IR) reflecting layer 19 provides for unexpected results. In particular, by using zinc oxide in this layer 22 (as opposed to solely tin oxide for example), the resulting coated article when heat treated unexpectedly has, for example: improved thermal stability, more neutral and/or desirable coloration, lower sheet resistance ($R_s$), and lower emissivity (e.g., hemispherical emissivity). These surprisingly results associated with the use of the combination layer stack portion of glass . . . ZnO/Ag/NiCrO$_x$/ZnO . . . as shown in FIG. 7 for example are highly advantageous and represent a significant improvement in the art, since lower emissivity, lower sheet resistance, desirable coloration and/or thermal stability are desired features in coated articles.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. While certain coated articles are heat treated herein, in other example embodiments heat treatment is optional.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 30 provided on the substrate 1 either directly or indirectly. The coating (or layer system) 30 includes: bottom dielectric layer 2 which may be of or include titanium oxide (e.g., TiO$_2$) or the like, dielectric silicon nitride layer 3 which may be Si$_3$N$_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride layer 14, tin oxide inclusive interlayer 15, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag). The aforesaid layers 2-25 make up low-E (i.e., low emissivity) coating 30 which is provided on glass or plastic substrate 1.

In monolithic instances, the coated article includes only one glass substrate 1 as illustrated in FIG. 1. However, monolithic coated articles herein may be used in devices such as laminated vehicle windshields, JO window units, and the like. A laminated vehicle window such as a windshield typically includes first and second glass substrates laminated to one another via a polymer based interlayer (e.g., see U.S. Pat. No. 6,686,050, the disclosure of which is incorporated herein by reference). One of these substrates of the laminate may support coating 30 on an interior surface thereof in certain example embodiments. As for IG window units, an IG window unit may include two spaced apart substrates. An example IG window unit is illustrated and described, for example, in U.S. Pat. No. 6,632,491, the disclosure of which is hereby incorporated herein by reference. An example IG window unit may include, for example, the coated glass substrate 1 shown in FIG. 1 coupled to another glass substrate via spacer(s), sealant(s) or the like with a gap being defined therebetween. This gap between the substrates in IG unit embodiments may in certain instances be filled with a gas such as argon (Ar). An example IG unit may comprise a pair of spaced apart clear glass substrates each about 4 mm thick, one of which is coated with a coating 30 herein in certain example instances, where the gap between the substrates may be from about 5 to 30 min, more preferably from about 10 to 20 mm, and most preferably about 16 mm. In certain example instances, the coating 30 may be provided on the interior surface of either substrate facing the gap.

Dielectric layer 2 is in direct contact with the glass substrate 1, and is optional. Dielectric layer 2 may be of or include TiO$_x$ in certain example embodiments of this invention, where x is from 1.5 to 2.0, more preferably about 2.0.

Dielectric layers 3 and 14 may be of or include silicon nitride in certain embodiments of this invention. Silicon nitride layers 3 and 14 may, among other things, improve heat-treatability of the coated articles, e.g., such as thermal tempering or the like. The silicon nitride of layers 3 and/or 14 may be of the stoichiometric type (i.e., Si$_3$N$_4$), or alternatively of the Si-rich type in different embodiments of this invention. For example, Si-rich silicon nitride 3 (and/or 14) combined with zinc oxide and/or tin oxide under a silver based IR reflecting layer may permit the silver to be deposited (e.g., via sputtering or the like) in a manner which causes its sheet resistance to be lessened compared to if certain other materials) were under the silver. Moreover, the presence of free Si in a Si-rich silicon nitride inclusive layer 3 may allow certain atoms such as sodium (Na) which migrate outwardly from the glass 1 during HT to be more efficiently stopped by the Si-rich silicon nitride inclusive layer before they can reach the silver and damage the same. Thus, it is believed that the oxidation caused by heat treatment allows visible transmission to increase, and that the Si-rich Si$_x$N$_y$ in layer 3 can reduce the amount of damage done to the silver layer(s) during HT in certain example embodiments of this invention thereby allowing sheet resistance ($R_s$) to decrease or remain about the same in a satisfactory manner.

In certain example embodiments, when Si-rich silicon nitride us used in layer 3 and/or 14, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting'layers may, however, be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized. In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire IR reflecting layer.

Dielectric layer 13 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Interlayer 15 of or including tin oxide is provided under IR reflecting layer 19 so as to be located between silicon nitride layer 14 and zinc oxide layer 17. Surprisingly, as explained above, it has been found that the use of such a tin oxide inclusive interlayer 15 results in numerous improvements compared to a situation where the layer 15 is not provided. For example, it has been found that the use of such a tin oxide inclusive interlayer 15 results in a coated article which is capable of realizing: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, (g) improved haze characteristics following heat treatment, and/or (h) improved mechanical durability such as scratch resistance before and/or after heat treatment. Thus, in certain example embodiments of this invention, coated articles may be taken to higher temperatures during heat treatment and/or for longer times without suffering undesirable significant transmission drops and/or increases in sheet resistance. In certain alternative embodiments, it is possible to dope the tin oxide of layer 15 with other materials such as Al, Zn or the like. Alternatively, other metal oxide(s) may be used for layer 15 in certain instances.

In certain example embodiments, it has been found that good optical properties are achieved when the total thickness of the combination of tin oxide inclusive layers 13 and 15 is from about 500 to 800 Å, more preferably from about 600 to 700 Å. This total thickness of the combination of layers 13 and 15 may be divided up in any suitable manner in certain example embodiments of this invention. Moreover, the total thickness of layers 3 and 7 may be from about 200 to 400 Å in certain example embodiments of this invention, more preferably from about 220 to 350 Å; and the total thickness of layers 23 and 25 (and optionally 50 in the FIG. 7 embodiment) may be from about 300 to 500 Å in certain example embodiments.

Dielectric layer 23 may be of or include tin oxide in certain example embodiments of this invention. However, layer 23 is optional and need not be provided in certain example embodiments of this invention. Dielectric layer 25, which may be an overcoat in certain example instances, may be of or include silicon nitride $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly:

Example Materials/Thicknesses

FIG. 1 Embodiment

| Layer<br>Glass (1-10 mm thick) | Preferred<br>Range (Å) | More<br>Preferred (Å) | Example<br>(Å) |
|---|---|---|---|
| $TiO_2$ (layer 2) | 10-120 Å | 20-80 Å | 33 Å |
| $Si_xN_y$ (layer 3) | 40-450 Å | 70-300 Å | 110 Å |
| $ZnO_x$ (layer 7) | 10-300 Å | 40-150 Å | 100 Å |
| Ag (layer 9) | 50-250 Å | 80-120 Å | 107 Å |
| $NiCrO_x$ (layer 11) | 10-100 Å | 12-40 Å | 18 Å |
| $SnO_2$ (layer 13) | 0-1,000 Å | 200-700 Å | 382 Å |
| $Si_xN_y$ (layer 14) | 50-450 Å | 80-200 Å | 110 Å |
| $SnO_2$ (layer 15) | 30-250 Å | 50-200 Å | 100 Å |
| $ZnO_x$ (layer 17) | 10-300 Å | 40-150 Å | 100 Å |
| Ag (layer 19) | 50-250 Å | 80-220 Å | 159 Å |
| $NiCrO_x$ (layer 21) | 10-100 Å | 20-45 Å | 36 Å |
| $SnO_2$ (layer 23) | 0-750 Å | 40-200 Å | 100 Å |
| $Si_3N_4$ (layer 25) | 0-750 Å | 80-320 Å | 193 Å |

In certain example embodiments of this invention, coated articles herein may have the following optical and solar characteristics set forth in Table 2 when measured monolithically (before any optional HT). The sheet resistances ($R_s$) herein take into account all IR reflecting layers (e.g., silver layers 9, 19).

Optical/Solar Characteristics (Monolithic; pre-HT)

| Characteristic | General | More Preferred | Most Preferred |
|---|---|---|---|
| $R_s$ (ohms/sq.): | <=5.0 | <=4.0 | <=3.0 |
| $E_n$: | <=0.07 | <=0.04 | <=0.03 |
| $T_{vis}$ (Ill. C. 2°): | >=70% | >=74% | >=75% |

In certain example embodiments, coated articles herein may have the following characteristics, measured monolithically for example, after heat treatment (HT):

Optical/Solar Characteristics (Monolithic; Post-HT)

| Characteristic | General | More Preferred | Most Preferred |
|---|---|---|---|
| $R_s$ (ohms/sq.): | <=3.0 | <=2.5 | <=2.1 (or <=2.0) |
| $E_n$: | <=0.07 | <=0.04 | <=0.03 |

-continued

| Characteristic | General | More Preferred | Most Preferred |
|---|---|---|---|
| $T_{vis}$ (Ill. C. 2°): | >=75% | >=77% | >=78% |
| Transmitted Haze: | <=0.6 | <=0.5 | <=0.4 |

Moreover, in certain example laminated embodiments of this invention, coated articles herein which have been heat treated to an extend sufficient for tempering, and which have been coupled to another glass substrate to form an IG unit, may have the following IG unit optical/solar characteristics.

Example Optical Characteristics (IG Unit: Post-HT)

| Characteristic | General | More Preferred |
|---|---|---|
| $T_{vis}$ (or TY)(Ill. C. 2°): | >=60% | >=69% |
| $a^*_t$ (Ill. C. 2°): | -6 to +1.0 | -5 to 0.0 |
| $b^*_t$ (Ill. C. 2°): | -2.0 to +8.0 | 0.0 to 4.0 |
| $L^*$ (Ill. C. 2°): | 80-95 | 84-95 |
| $R_fY$ (Ill. C., 2 deg.): | 1 to 13% | 1 to 12% |
| $a^*_f$ (Ill. C., 2°): | -5.0 to +2.0 | -4.0 to +0.5 |
| $b^*_f$ (Ill. C., 2°): | -14.0 to +10.0 | -4.0 to +3.5 |
| $L^*$ (Ill. C. 2°): | 30-45 | 33-41 |
| $R_gY$ (Ill. C., 2 deg.): | 1 to 12% | 1 to 10% |
| $a^*_g$ (Ill. C., 2°): | -5.0 to +2.0 | -2.5 to +0.5 |
| $b^*_g$ (Ill. C., 2°): | -10.0 to +10.0 | -5.0 to 0 |
| $L^*$ (Ill. C. 2°): | 30-40 | 33-38 |
| SHGC (surface 2): | <=0.42 | <=0.38 |
| SHGC (surface 3): | <=0.47 | <=0.45 |

The following examples are provided for purposes of example only, and are not intended to be limiting unless specifically claimed.

EXAMPLES

The following Examples were made via sputtering on 6 mm thick clear glass substrates so as to have approximately the layer stacks set forth below. Example 1 is according to an example embodiment of this invention as shown in FIG. 1, whereas the Comparative Example is provided for purposes of comparison. The thicknesses are in units of angstroms (Å) and are approximations.

| Layer<br>Glass Substrate | Comparative Example | Example 1 |
|---|---|---|
| $TiO_2$ | 33.1 | 33.1 |
| $Si_3N_4$ | 110 | 110 |
| ZnO | 100 | 100 |
| Ag | 107 | 107 |
| $NiCrO_x$ | 36.5 | 18.3 |
| $SnO_2$ | 482.7 | 382.7 |
| $Si_3N_4$ | 110 | 110 |
| $SnO_2$ | 0 | 100 |
| ZnO | 100 | 100 |
| Ag | 159.5 | 159.5 |
| $NiCrO_x$ | 36.5 | 36.5 |
| $SnO_2$ | 100 | 100 |
| $Si_3N_4$ | 193.4 | 193.4 |

It can be seen from the above that Example 1 and the Comparative Example are similar, except the tin oxide interlayer 15 is provided in Example 1 but is not in the Comparative Example. After being sputter deposited onto the glass substrates, the Example coated articles were heat treated in a manner sufficient for tempering.

FIGS. 2-5 compare Example 1 (IMP) to the Comparative Example (STD) with regard to thermal stability behavior/characteristics during and after heat treatments. FIGS. 2-5 are based on monolithic measurements, and furnace exposure time in minutes at about 650 degrees C. Of course, during heat treatment, the coated articles need not be heat treated for as long as is shown in FIGS. 2-5; FIGS. 2-5 illustrate lengthy heat treatment at high temperature in order to emphasize certain advantages of certain example embodiments of this invention.

Figure 2:
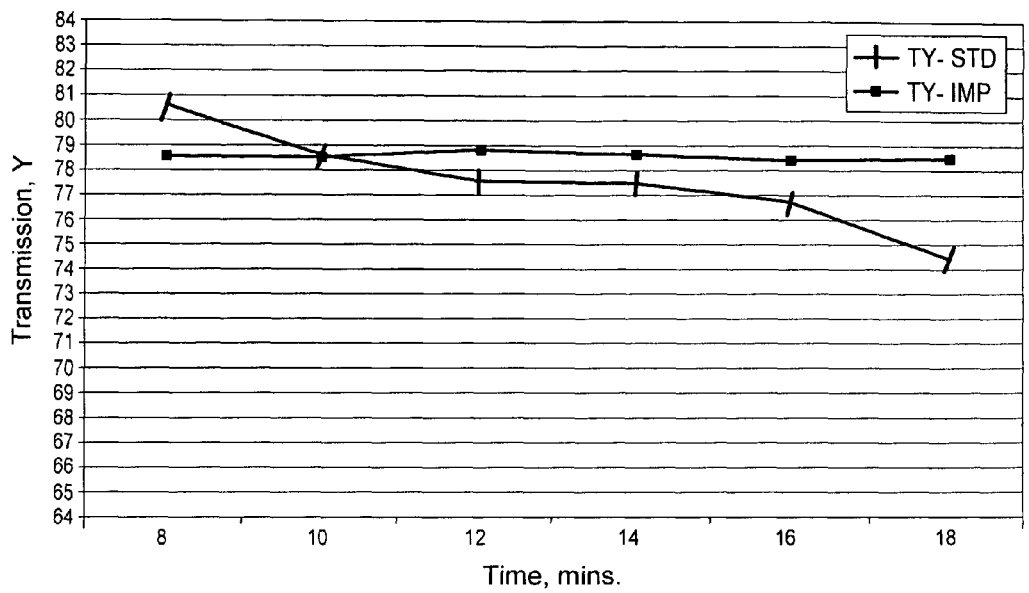
FIG. 2 is graph comparing changes in visible transmission (Ill. C, 2 degree obs.) due to heat treatment for an example embodiment of this invention versus a Comparative Example (CE).

FIG. 2 illustrates that visible transmission for the Comparative Example (STD) significantly dropped during heat treatment, whereas the visible transmission of Example 1 (IMP) did not. Thus, it can be seen that the provision of the tin oxide inclusive interlayer 15 in the coated article of Example 1 surprisingly resulted in less visible transmission shift during heat treatment, and is also capable of allowing higher visible transmission in the post-HT coated article.

Figure 3:
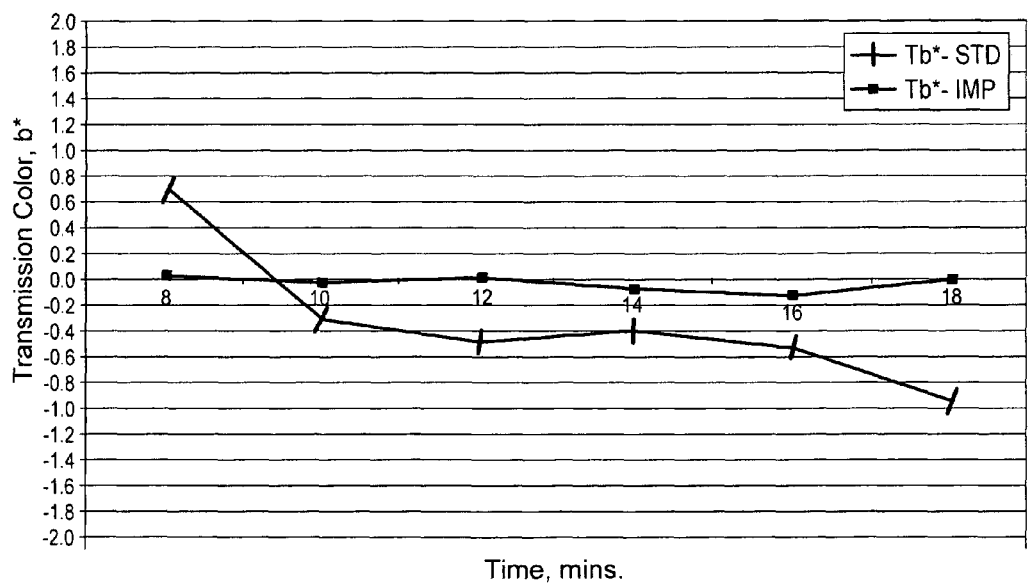
FIG. 3 is graph comparing changes in transmissive b* coloration (Ill. C, 2 degree obs.) due to heat treatment for an example embodiment of this invention versus the Comparative Example (CE).

FIG. 3 illustrates that transmissive b* coloration for the Comparative Example (STD) significantly changed (i.e., from about 0.7 to almost −1.0) during heat treatment, whereas the b* value for Example 1 (IMP) did not shift as much. Thus, it can be seen that the provision of the tin oxide inclusive interlayer 15 in the coated article of Example 1 surprisingly resulted in less transmissive b* color shift during heat treatment, and is also capable of allowing more neutral b* coloration in the post-HT coated article.

Figure 4:
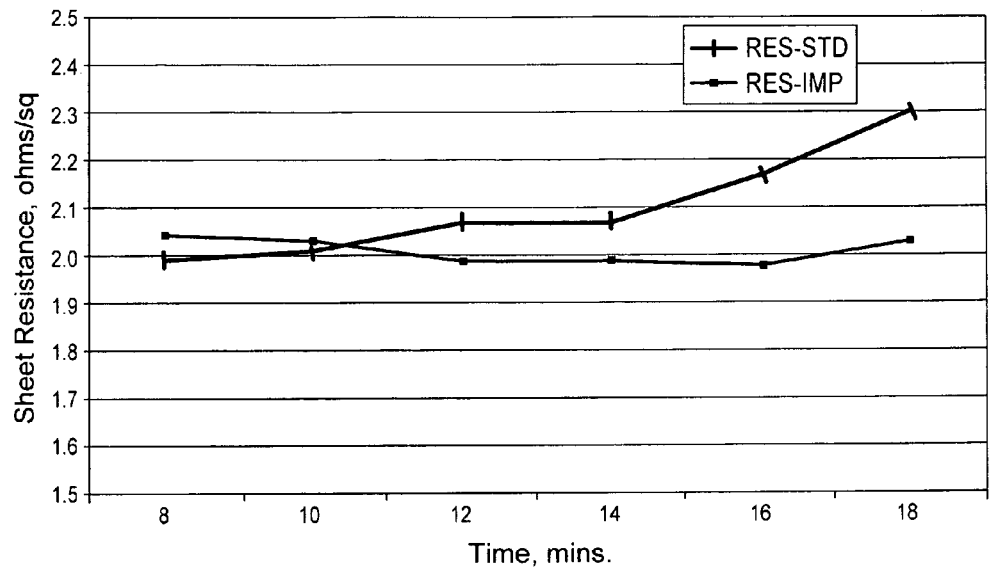
FIG. 4 is graph comparing changes in sheet resistance due to heat treatment for an example embodiment of this invention versus the Comparative Example (CE).

FIG. 4 illustrates that sheet resistance ($R_s$) of the Comparative Example (STD) significantly increased during heat treatment, whereas the sheet resistance of Example 1 (IMP) did not. Thus, it can be seen that the provision of the tin oxide inclusive interlayer 15 in the coated article of Example 1 surprisingly resulted in less sheet resistance increase during heat treatment, and is also capable of allowing improved (i.e., lower) sheet resistance in the post-HT coated article.

Figure 5:
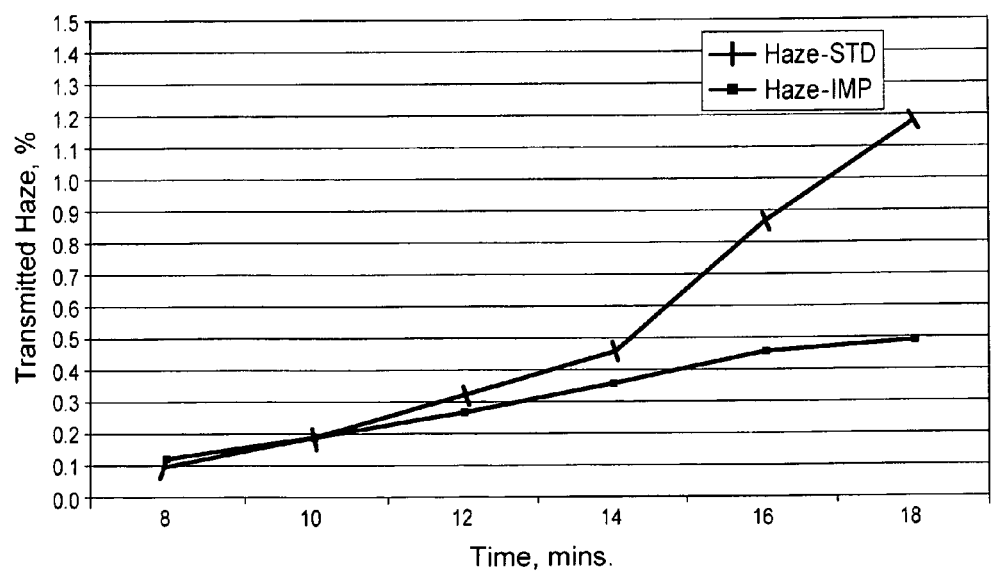
FIG. 5 is graph comparing changes in transmitted haze due to heat treatment for an example embodiment of this invention versus the Comparative Example (CE).

FIG. 5 illustrates that transmitted haze of the Comparative Example (STD) significantly increased much more than did that of Example 1 (IMP). Thus, it can be seen that the provision of the tin oxide inclusive interlayer 15 in the coated article of Example 1 surprisingly resulted in improved haze characteristics in the post-HT coated article.

It can be seen from FIGS. 2-5 that coated articles according to certain example embodiments of this invention are capable of being heat treated at a furnace temperature of about 650 degrees C. for 18 minutes, and realizing at least one of the following due to such heat treatment: (a) a visible transmission that does not decrease by more than 1% due to such heat treatment from the 8 minute mark to the 18 minute mark, and which preferably does not decrease at all due to such heat treatment from the 8 minute mark to the 18 minute mark; (b) a transmissive b* value which does not change by more than 1.0 from the 8 minute mark to the 18 minute mark, more preferably does not change by more than 0.5, and most preferably does not change by more than 0.3 due to such heat treatment from the 8 minute mark to the 18 minute mark; (c) a sheet resistance in units of ohms/square which does not increase by more than 0.1 due to such heat treatment from the 8 minute mark to the 18 minute mark, and which preferably does not increase at all due to such heat treatment from the 8 minute mark to the 18 minute mark; and (d) a transmitted haze value which does not increase by more than 0.5 due to such heat treatment from the 8 minute mark to the 18 minute mark, and which preferably is no greater than about 0.5 after such heat treatment measured monolithically.

In certain other example embodiments of this invention, coated articles with two silver based layers are capable of being heat treated at a furnace temperature of about 650 degrees C. for 12 minutes, and realizing at least one of the following due to such heat treatment: (a) a visible transmission that does not decrease between the 8 and 12 minute marks of such heat treatment; (b) a transmissive b* value which does not change by more than 1.0, more preferably does not change by more than 0.5, and most preferably does not change by more than 0.3 from the 8 minute mark to the 12 minute mark of such heat treatment; (c) a sheet resistance in units of ohms/square which does not increase from the 8 minute mark to the 12 minute mark of such heat treatment.

In view of FIGS. 2-5 discussed above, example advantage and unexpected results associated with certain example embodiments of this invention are clear.

FIGS. 6(a)-6(b) illustrate the surprisingly improved scratch resistance characteristics associated with certain example embodiments of this invention. FIG. 6(a) is a surface morphology image of scratches for the Comparative Example, whereas FIG. 6(b) is a surface morphology image of scratches for Example 1. It can be seen that Example 1 was much less susceptible to scratching than was the Comparative Example. In particular, the Comparative Example in FIG. 6(a) realized much taller features compared to Example 1 in FIG. 6(b) (about 6,000 Å compared to about 3,000 Å). Moreover, the Comparative Example in FIG. 6(a) realized much wider features compared to Example 1 in FIG. 6(b). These mechanical durability problems associated with the Comparative Example, shown in FIG. 6(a), often result in delamination which of course is undesirable. In contrast, the improved features of Example 1 shown in FIG. 6(b) do not result in delamination, thereby evidencing the significantly improved mechanical durability associated with certain example embodiment of this invention.

It is noted that before and after heat treatment for about eight minutes at a furnace temperature of about 650 degrees C., the coated article of Example 1 had the following characteristics, measured monolithically.

Example 1

Monolithic, Before/After HT

| Characteristic | pre-HT | Post-HT |
|---|---|---|
| $T_{vis}$ (or TY)(Ill. C. 2°): | 72.82% | 78.53% |
| $a*_t$ (Ill. C. 2°): | −2.96 | −1.79 |
| $b*_t$ (Ill. C. 2°): | 2.49 | 0.02 |
| $R_fY$ (Ill. C., 2 deg.): | 6.56% | 5.97% |
| $a*_f$ (Ill. C., 2°): | −6.75 | −7.99 |
| $b*_f$ (Ill. C., 2°): | 9.89 | 7.20 |
| L* (Ill. C. 2°): | 30.77 | 29.35 |
| $R_gY$ (Ill. C., 2 deg.): | 7.21% | 5.94% |
| $a*_g$ (Ill. C., 2°): | −1.31 | −1.99 |
| $b*_g$ (Ill. C., 2°): | 0.79 | −1.53 |
| L* (Ill. C., 2°): | 32.29 | 29.26 |
| $R_s$ (ohms/square): | 2.68 | 2.04 |
| Haze: | 0.15 | 0.12 |

FIG. 7 illustrates another example embodiment of this invention. Where like reference numerals are used to indicate the same layers in the FIG. 7 and FIG. 1 embodiments, the layers are the same in the FIG. 7 embodiment as in the FIG. 1 embodiment discussed above. The FIG. 7 embodiment is similar to the FIG. 1 embodiment, except that layer 2 has been eliminated, and layers 22 and optionally 50 added.

With respect to the FIG. 7 embodiment, surprisingly, it has been found that the provision of zinc oxide inclusive layer 22 directly over the nickel chrome oxide contact layer 21 above the silver infrared (IR) reflecting layer 19 provides for unexpected results. In particular, by using zinc oxide in this layer 22 (as opposed to solely tin oxide for example), the resulting coated article when heat treated unexpectedly has, for example: improved thermal stability, more neutral and/or desirable coloration, lower sheet resistance ($R_s$), and lower emissivity (e.g., hemispherical emissivity). These surprisingly results associated with the use of the combination layer stack portion of glass . . . ZnO/Ag/NiCrO$_x$/ZnO . . . are highly advantageous and represent a significant improvement in the art, since lower emissivity, lower sheet resistance, desirable coloration and/or thermal stability are desired features in coated articles. Thus, in certain example embodiments of this invention, coated articles may be taken to higher temperatures during heat treatment without suffering undesirable color shifts, significant transmission drops, and/or increases in sheet resistance (this is advantageous in view of the fact that many different types of furnaces may be used to heat treat coated articles, and different furnaces typically have different characteristics such as temperature). Additionally, it has also been found that by using zinc oxide in this layer 22 (as opposed to solely tin oxide for example), the resulting coated article is unexpectedly more durable with respect to temperature/humidity testing.

While the reasons for these unexpected results associated with the use of zinc oxide in layer 22 are not entirely clear, it is believed that the use of the zinc oxide in layer 22 for some reason causes the silver of IR reflecting layer 19 to be more dense and have a more preferred orientation before and/or after heat treatment (HT). It is very surprising that this is the case, especially since a contact layer 21 (e.g., NiCrO$_x$) is provided between the zinc oxide layer 22 and the silver layer 19. Because the zinc oxide in layer 22 causes the silver in layer 19 to be more dense and/or have a more preferred orientation, the silver in layer 19 and thus the overall coating is better able to withstand heat treatment at high temperatures so that a heat treated coated article with lower sheet resistance and emissivity is obtainable. Moreover, because the zinc oxide in layer 22 causes the silver in layer 19 to be more dense and/or have a more preferred orientation, it is believed that color shifting during heat treatment can be controlled in a desirable manner.

It is also possible in certain example embodiments to provide a layer of or including zirconium oxide 50 as an overcoat layer in certain example embodiments of this invention (e.g., see FIG. 7). It has surprisingly been found that the provision of the zirconium oxide inclusive overcoat unexpectedly allows for visible transmission to be higher following HT, compared to if the zirconium oxide layer was not present. In certain example embodiments, the index "n" of the zirconium oxide layer 50 is from about 2.1 to 2.25, more preferably about 2.16 (at 550 nm).

While various materials and layer thicknesses may be used in connection with the FIG. 7 embodiment, example materials and thicknesses are set forth below.

Example Materials/Thicknesses

FIG. 7 Embodiment

| Layer<br>Glass (1-10 mm thick) | Preferred<br>Range (Å) | More<br>Preferred (Å) | Example<br>(Å) |
|---|---|---|---|
| Si$_x$N$_y$ (layer 3) | 40-450 Å | 70-300 Å | 186 Å |
| ZnO$_x$ (layer 7) | 10-300 Å | 40-150 Å | 107 Å |
| Ag (layer 9) | 50-250 Å | 80-120 Å | 107 Å |
| NiCrO$_x$ (layer 11) | 10-100 Å | 12-40 Å | 30 Å |
| SnO$_2$ (layer 13) | 0-1,000 Å | 200-700 Å | 412 Å |
| Si$_x$N$_y$ (layer 14) | 50-450 Å | 80-200 Å | 131 Å |
| SnO$_2$ (layer 15) | 30-250 Å | 50-200 Å | 108 Å |
| ZnO$_x$ (layer 17) | 10-300 Å | 40-150 Å | 119 Å |
| Ag (layer 19) | 50-250 Å | 80-220 Å | 103 Å |

-continued

| Layer<br>Glass (1-10 mm thick) | Preferred<br>Range (Å) | More<br>Preferred (Å) | Example<br>(Å) |
|---|---|---|---|
| NiCrO$_x$ (layer 21) | 10-100 Å | 20-45 Å | 33 Å |
| ZnO$_x$ (layer 22) | 10-300 Å | 30-150 Å | 58 Å |
| SnO$_2$ (layer 23) | 0-750 Å | 100-350 Å | 277 Å |
| Si$_3$N$_4$ (layer 25) | 10-750 Å | 20-100 Å | 53 Å |
| ZrO$_x$ (layer 50) | 0-200 Å | 10-50 Å | 22 Å |

The following Examples 2-3 were made via sputtering on a 2.1 mm thick clear glass substrate 1 so as to have approximately the layer stack set forth below (e.g., see FIG. 7 embodiment). Example 2 did not include the zirconium oxide overcoat layer 50, whereas Example 3 did. Comparative Example 2 (C2) was similar to Example 2, except that C2 did not have the zinc oxide layer 22 (comparing Example 2 and C2 illustrates the surprising advantage of the zinc oxide layer 22 with respect to thermal stability). The zinc oxide layers were doped with about 2-3% Al. The thicknesses are in units of angstroms (Å) and are approximations.

| Layer<br>Glass Substrate | Example 2 | Example 3 | C2 |
|---|---|---|---|
| Si$_x$N$_y$ | 186 | 186 | 186 |
| ZnO | 107 | 107 | 107 |
| Ag | 107 | 107 | 107 |
| NiCrO$_x$ | 30 | 30 | 30 |
| SnO$_2$ | 412 | 412 | 412 |
| Si$_x$N$_y$ | 131 | 131 | 131 |
| SnO$_2$ | 108 | 108 | 108 |
| ZnO | 119 | 119 | 119 |
| Ag | 103 | 103 | 103 |
| NiCrO$_x$ | 33 | 33 | 33 |
| ZnO | 58 | 58 | 0 |
| SnO$_2$ | 279 | 279 | 337 |
| Si$_3$N$_4$ | 53 | 53 | 53 |
| ZrO | 0 | 22 | 0 |

After being sputter deposited onto the glass substrates, the example coated articles were heat treated in a manner sufficient for tempering (in a belt furnace). The coated articles had the following characteristics, measured monolithically before (annealed) and after HT. The characteristics of Examples 2-3 and C2 (all according to examples of this invention), before and after HT, as set forth below for example.

Example 2

Monolithic, Before/After HT

| Characteristic | Ex. 2 (annealed) | Ex. 2 (post-HT) |
|---|---|---|
| T$_{vis}$ (or TY)(Ill. C. 2°): | 77.69% | 81.21% |
| a*$_t$ (Ill. C. 2°): | -4.87 | -2.87 |
| b*$_t$ (Ill. C. 2°): | 5.42 | 0.25 |
| R$_g$Y (Ill. C., 2 deg.): | 6.36% | 7.20% |
| a*$_f$(Ill. C., 2°): | 8.01 | 0.16 |
| b*$_f$(Ill. C., 2°): | 4.25 | 10.70 |
| L* (Ill. C. 2°): | 30.30 | 32.26 |
| R$_g$Y (Ill. C., 2 deg.): | 7.52% | 8.04% |
| a*$_g$ (Ill. C., 2°): | 14.05 | 6.69 |
| b*$_g$ (Ill. C., 2°): | -5.78 | 3.29 |
| L* (Ill. C. 2°): | 32.96 | 34.08 |
| R$_s$ (ohms/square): | 2.79 | 1.9 |

Example 3

Monolithic, Before/After HT

| Characteristic | Ex. 3 (annealed) | Ex. 3 (post-HT) |
| --- | --- | --- |
| $T_{vis}$ (or TY)(Ill. C. 2°): | 77.77% | 81.71% |
| $a*_t$ (Ill. C. 2°): | −5.21 | −3.60 |
| $b*_t$ (Ill. C. 2°): | 5.97 | 0.88 |
| $R_fY$ (Ill. C., 2 deg.): | 6.02% | 6.82% |
| $a*_f$ (Ill. C., 2°): | 10.51 | 3.97 |
| $b*_f$ (Ill. C., 2°): | 0.44 | 6.60 |
| $L*$ (Ill. C. 2°): | 29.47 | 31.39 |
| $R_gY$ (Ill. C., 2 deg.): | 7.31% | 7.77% |
| $a*_g$ (Ill. C., 2°): | 15.71 | 10.24 |
| $b*_g$ (Ill. C., 2°): | −8.40 | −0.55 |
| $L*$ (Ill. C. 2°): | 32.50 | 33.50 |
| $R_s$ (ohms/square): | 2.78 | 2.02 |
| Haze: | n/a | 0.39 |

Comparative Example 2

C2 (Monolithic, Before/After HT)

| Characteristic | C2 (annealed) | C2 (post-HT) |
| --- | --- | --- |
| $T_{vis}$ (or TY)(Ill. C. 2°): | 77.23% | 79.79% |
| $a*_t$ (Ill. C. 2°): | −4.27 | −3.32 |
| $b*_t$ (Ill. C. 2°): | 4.28 | −0.02 |
| $R_fY$ (Ill. C., 2 deg.): | 6.66% | 7.47% |
| $a*_f$ (Ill. C., 2°): | 5.80 | 1.36 |
| $b*_f$ (Ill. C., 2°): | 8.95 | 11.37 |
| $L*$ (Ill. C. 2°): | 31.02 | 32.85 |
| $R_gY$ (Ill. C., 2 deg.): | 7.72% | 8.23% |
| $a*_g$ (Ill. C., 2°): | 12.37 | 8.18 |
| $b*_g$ (Ill. C., 2°): | −2.04 | 3.50 |
| $L*$ (Ill. C. 2°): | 33.40 | 34.46 |
| $R_s$ (ohms/square): | 2.7 | 2.1 |

It can be seen by comparing Example 2 to Comparative Example 2 above that the provision of zinc oxide layer 22 in Example 2 (it is not in Comparative Example 2) surprisingly results in improved (reduced) sheet resistance ($R_s$), and improved thermal stability (e.g., higher visible transmission following HT). Moreover, by comparing Examples 2 and 3, it can be seen that the provision of zirconium oxide overcoat layer 50 in the FIG. 7 embodiment surprisingly results in higher visible transmission following HT (i.e., Example 3 had a higher visible transmission than did Example 2).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article comprising a coating supported by a glass substrate, the coating comprising:
a first IR reflecting layer comprising silver;
a layer comprising zinc oxide located over the first IR reflecting layer comprising silver, the layer comprising zinc oxide being located over and contacting a layer comprising tin oxide, so that the layer comprising tin oxide is located between and contacting a layer comprising silicon nitride and the layer comprising zinc oxide;
a second IR reflecting layer comprising silver located over and contacting the layer comprising zinc oxide;
a contact layer located over and contacting the second IR reflecting layer;
another layer comprising metal oxide comprising tin oxide and/or zinc oxide located over and contacting the contact layer; and
a dielectric layer comprising nitride located over at least the another layer comprising metal oxide.

2. The coated article of claim 1, wherein said layer comprising zinc oxide further comprises aluminum.

3. The coated article of claim 1, wherein the coated article is thermally tempered.

4. The coated article of claim 1, wherein the coated article comprises a heat treated glass substrate which supports the coating, and when measured monolithically following heat treatment has a visible transmission of at least 75% and a sheet resistance (Rs) of less than or equal to 3.0 ohms/square.

5. The coated article of claim 1, wherein the coated article comprises a heat treated glass substrate which supports the coating, and when measured monolithically following heat treatment has a visible transmission of at least 77% and a sheet resistance (Rs) of less than or equal to 2.5 ohms/square.

6. The coated article of claim 1, wherein:
(a) the coated article comprises a heat treated glass substrate which supports the coating, and when measured monolithically following heat treatment has a visible transmission of at least 80% and a sheet resistance (Rs) of less than or equal to 2.1 ohms/square; and/or
(b) wherein the coated article is an IG window unit having a visible transmission of at least 60%, and a SHGC value of less than or equal to 0.40.

7. The coated article of claim 1, further comprising a layer comprising zirconium oxide which is an overcoat layer that is an outermost layer of the coating.

8. The coated article of claim 1, wherein the contact layer comprises Ni and/or Cr.

9. The coated article of claim 1, wherein the contact layer comprises an oxide of NiCr.

10. The coated article of claim 1, wherein said dielectric layer comprising nitride comprises silicon nitride.

11. The coated article of claim 1, wherein said another layer comprising metal oxide comprises tin oxide.

12. The coated article of claim 1, wherein said another layer comprising metal oxide comprises zinc oxide.

13. The coated article of claim 1, wherein said dielectric layer comprising nitride is located over and directly contacting said another layer comprising metal oxide.

14. The coated article of claim 1, further comprising another layer comprising zinc oxide located under and contacting the first IR reflecting layer comprising silver.

15. The coated article of claim 1, further comprising a layer comprising an oxide of titanium located between the glass substrate and said first IR reflecting layer.

16. The coated article of claim 1, further comprising a layer comprising silicon nitride located between the glass substrate and said first IR reflecting layer.

* * * * *